(No Model.)
A. M. & J. F. CHANCE.
APPARATUS FOR OBTAINING SULPHURETED HYDROGEN FROM ALKALI.
No. 403,248. Patented May 14, 1889.
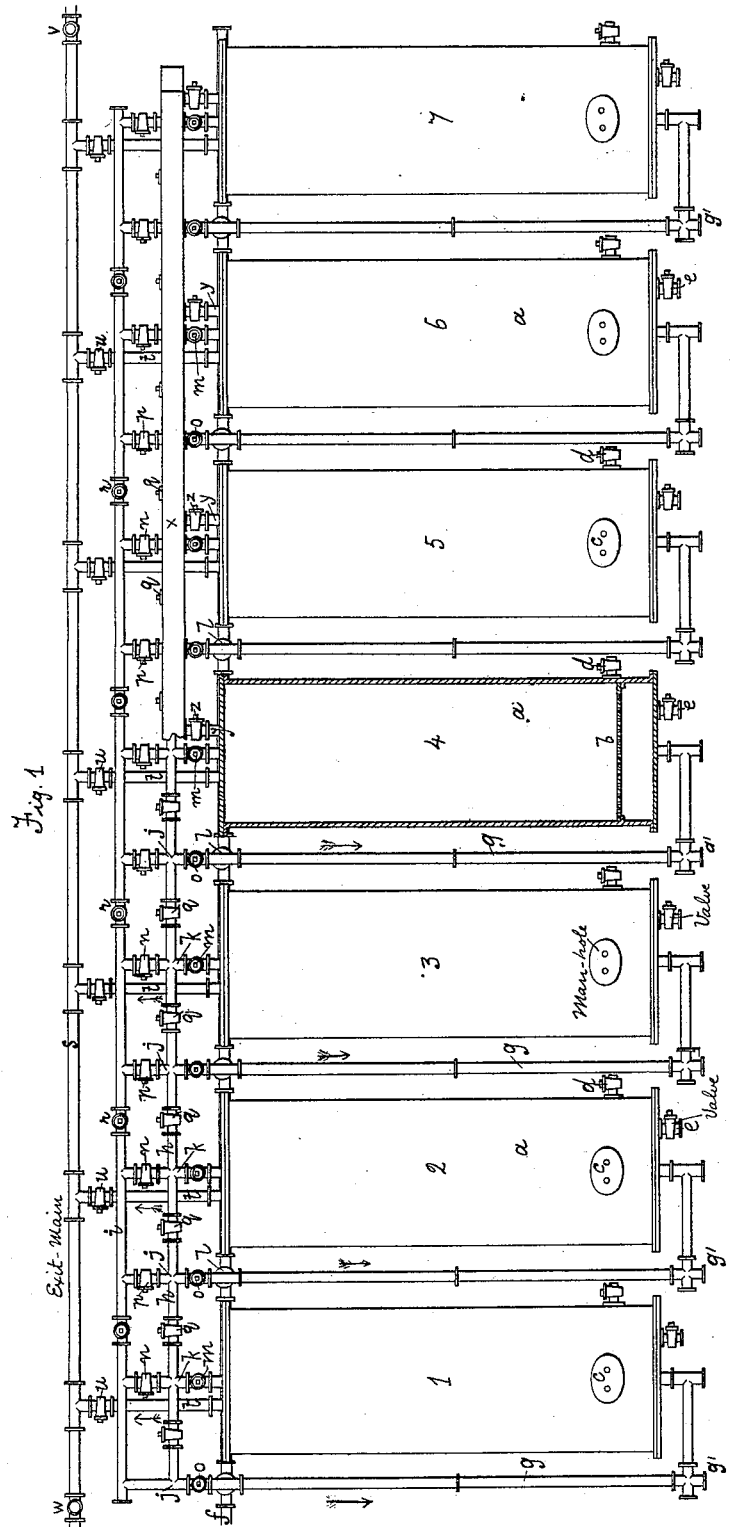
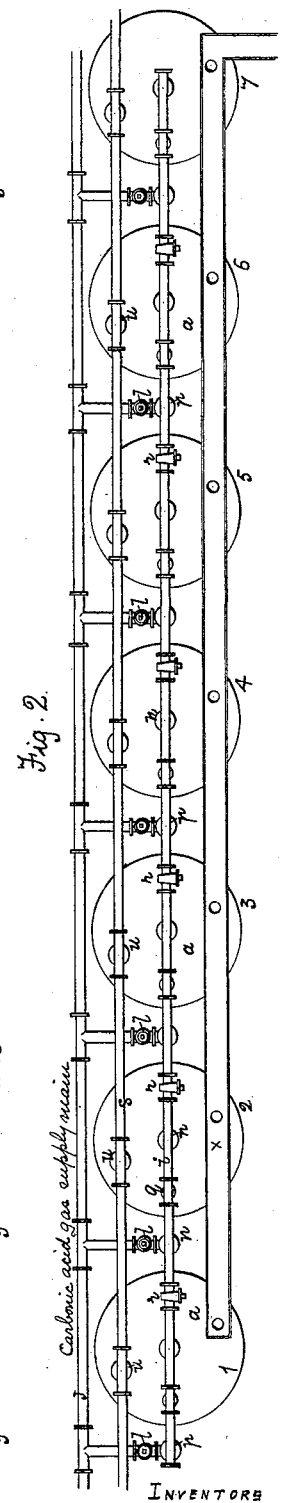

UNITED STATES PATENT OFFICE.

ALEXANDER MACOMB CHANCE AND JAMES FREDERICK CHANCE, OF OLDBURY, COUNTY OF WORCESTER, ENGLAND.

APPARATUS FOR OBTAINING SULPHURETED HYDROGEN FROM ALKALI.

SPECIFICATION forming part of Letters Patent No. 403,248, dated May 14, 1889.

Application filed December 14, 1888. Serial No. 293,585. (No model.) Patented in England June 16, 1887, No. 8,666; in France September 6, 1887, No. 185,677, and in Belgium September 7, 1887, No. 78,799.

*To all whom it may concern:*

Be it known that we, ALEXANDER MACOMB CHANCE and JAMES FREDERICK CHANCE, of Oldbury, in the county of Worcester, England, have invented a new and useful Apparatus for use in Obtaining Sulphureted Hydrogen from Alkali Waste, (for which apparatus patents have been obtained in Great Britain, No. 8,666, dated June 16, 1887; in France, No. 185,677, dated September 6, 1887, and in Belgium, No. 78,799, dated September 7, 1887;) and we do hereby declare the following to be a full, clear, and exact description thereof.

The apparatus is designed for use in the process for obtaining sulphureted hydrogen from alkali waste for which we have applied for Letters Patent simultaneously with this.

Figure 1 is a longitudinal elevation, part being in section; and Fig. 2, a plan of apparatus under our invention.

$a$ represents seven tall cylindrical vessels, such as we prefer to use, and are marked 1 to 7.

$b$ represents false bottoms perforated with small holes.

$c$ represents man-holes and lids for allowing access to the interior of the vessels.

$d$ represents taps or valves above, and $e$ represents taps or valves below, the perforated bottoms $b$ for the purpose of running off the contents of the vessels $a$, the taps or valves $e$ being being used only when it is necessary to empty the space below the perforated bottoms.

$f$ represents carbonic-acid-gas-supply main.

$g$ represents descending pipes leading from the supply-main $f$ to the vessels $a$ beneath the perforated bottoms $b$, the pipes $g$ being fitted at the bends with pieces $g'$, having covers, or with hooded bends, to allow of the use of rods to clear away any stoppage in the said pipes $g$. These rods may be, and preferably are, fitted to work through stuffing-boxes.

$h$ represents the connecting-main.

$i$ represents the return-main.

$j$ represents pipes leading from the connecting and return mains $h$ and $i$ to the descending pipes $g$.

$k$ represents pipes leading from the tops of the vessels $a$ to the said connecting and return mains.

$l$ represents taps or valves on branch pipes from the gas-supply main $f$ for opening and closing communication between the said main $f$ and the descending pipes $g$.

$m$ and $n$ represent taps or valves in the pipes $k$ between the vessels $a$ and the connecting-main $h$ and between the connecting-main $h$ and the return-main $i$, respectively.

$o$ and $p$ represent taps or valves on the pipes $j$ between the descending pipes $g$ and the connecting-main $h$ and between the connecting-main $h$ and the return-main $i$, respectively.

$q$ and $r$ represent taps or valves between the pipes $j$ and $k$ in the mains $h$ and $i$, respectively.

$s$ represents the exit-main, connected to the tops of the vessels $a$ through pipes marked $t$.

$u$ represents taps or valves on the pipes $t$ for opening and closing communication between the exit-main and the vessels $a$.

$v$ represents a tap or valve for opening and closing communication between the exit-main $s$ and the gas holder or store for sulphureted hydrogen, or place where the same is to be used.

$w$ represents a tap or valve between the exit-main $s$ and the atmosphere. By another arrangement the exit-main $s$ may be closed at one end and be at the other end divided into two branches—one leading to the atmosphere and the other to the gas-holder or place where the sulphureted hydrogen is to be stored or used—each branch being furnished with a tap or valve. The taps $u$, $v$, and $w$ should always be either fully opened or fully closed, since if only partly opened they are liable to become worn by the action or friction of the gases. We do not, therefore, use these taps to govern the flow of gases; but we put for this purpose one or more taps, which we will call "check-taps," and which are not shown in the appended drawings, on the main s. Although these check-taps become worn, the other taps will always close tightly and prevent leakage.

x represents a conduit for the mixture of alkali waste and water.

y represents pipes connecting the conduit x with the tops of the vessels a.

z represents taps or valves on the pipes y.

In place of the false bottoms b distributing-roses or other arrangements may be employed.

In treating alkali waste under our invention in the apparatus herein described the number of vessels used for one cycle of operations will depend in a great measure on their size and construction and on the power of the pump, aspirator, or other agent by which the gases are to be forced or drawn through the series of vessels; but it will not be convenient to employ fewer than three vessels for one cycle of operations, as we require a last vessel from which the first gases are delivered into the atmosphere, an intermediate vessel from which the strong gases are taken for storage or use, and a first vessel the contents of which shall during the time that the two kinds of gases are passing away have become completely carbonated.

In describing, as follows, our method of procedure we assume the employment of five vessels in one cycle of operations. These vessels—say Nos. 1 to 5, as on the appended drawings—are filled to the required height—say about two-thirds full—with the mixture of alkali waste and water through the conduit x, pipes y, and taps z. Communication is then shut off between the vessels a and the conduit x, and the tap l between the gas-main f and the descending pipe g, leading to the first vessel—in this case No. 1—is opened, so as to allow the gases to enter the said vessel. Such taps m, q, and o are opened as will allow the gases passing off from the first vessel to flow by the pipes k, main h, and pipes j and g to the second vessel of the series, and so on to the last vessel—in this case No. 5. From this last vessel the gases pass by a pipe, t and tap u to the exit-main s, and from the exit-main s by the tap w to the atmosphere. After a time it is found that gases may be obtained from one of the vessels—probably in this case No. 3—containing sufficient sulphureted hydrogen to render them of use. The tap m, therefore, between the third and fourth vessels and the tap u between the fifth vessel and the exit-main and the tap w in the exit-main are closed, while the tap u on the pipe t, leading from the third vessel to the exit-main, and the tap v on that end or branch of the exit-main which leads to the gas-holder or place where the sulphureted hydrogen is to be used are opened. While the strong gas is passing away through the tap v to be utilized, other empty vessels of the series—in this case say Nos. 6 and 7—are filled with a mixture of alkali waste and water. When the gas issuing past the tap v becomes too dilute for use, the said tap v and the tap u between the third vessel and the exit-main are closed, and the tap l between the first vessel of the series and the gas-main f and the tap o between the second and third vessels are also closed. The tap l between the gas-main f and the third vessel, and also the several taps m q o, governing communication between the third and remaining vessels, are opened. The tap u between the last vessel—in this case now No. 7—and the exit main and tap w in the exit-main are also opened. The contents of vessels Nos. 1 and 2, which should now have been completely carbonated, are blown or drawn out through the taps d. If it is found that the contents of only one of these vessels have been completely carbonated, only that one of them is emptied, the other being connected to the gas-main, so as to become the first of the series, instead of the third vessel being so connected, as above set forth. If it is desired that a vessel or vessels in the direct order of the series should be omitted—say No. 3 in the series 2, 3, 4, 5, 6, 7—the tap o between the second and third vessels and the tap m between the third and fourth vessels are closed and the taps q between vessels Nos. 2 and 4 opened. When the series is so used that gases have to travel from one vessel to another in the opposite direction to the series—that is to say, from a vessel later to a vessel earlier in the series—such taps m n r p o are opened as will allow the gases to flow from such later vessel through the return-main i to the descending pipe g, leading into the earlier vessel.

It will be obvious that by the proper opening and closing of taps or valves any number of vessels may be used in series, and that any of the said vessels may be made in turn the first, intermediate, or last of the series, and that any vessel or vessels may be passed over. It will further be obvious that the vessels may be worked as two series.

We claim—

1. Apparatus for obtaining sulphureted hydrogen separated from a large portion of other gases, such apparatus consisting of a number of vessels for containing the alkali waste and water, a supply-main for the carbonic acid, a connecting-main for establishing connection between the vessels, inlet-pipes for conveying the carbonic acid into the bottom of said vessels, two branches for each of said inlet-pipes, one putting the inlet-pipe in communication with the supply-main and the other in communication with the connecting-main, and both provided with taps or valves, a discharge-main for the products of decomposition, provided with two outlets and taps, whereby the gases may be discharged from either outlet, and pipes connecting the upper part of each vessel with the connecting-main and the discharge-main and provided with taps or valves intermediate the said vessel and each of the said mains, substantially as described.

2. In combination with a number of vessels, a supply-main, a connecting-main, a return-main, and a discharge-main provided with branch pipes and taps or valves as follows, whereby said vessels can be connected in series in any order—that is to say, inlet pipes or branches for putting each vessel in communication with any one of the first three of said mains—so that any vessel may be supplied from the supply-main, from the connecting-main, or from the return-main, and outlet pipes or branches for putting each vessel in communication with any one of the last three of said mains—namely, the connecting-main, the return-main, or the discharge-main—so that any vessel may discharge into any one of them, substantially as described.

3. Apparatus composed of a number of upright vessels, a main with a branch to each vessel for supplying liquid to the same, a gas-inlet pipe communicating with the lower part of each vessel, a draw-off tap or taps at the bottom of each vessel, a supply-main, a connecting-main, a return-main, branches and taps for putting the said gas-inlet pipes in communication with any one of the three last-mentioned mains, a discharge-main provided with two outlets and taps therefor, and branch pipes and taps for putting the upper part of each vessel in communication with said connecting-main, with said return-main, or with said discharge-main, substantially as described.

In testimony whereof we, the said ALEXANDER MACOMB CHANCE and JAMES FREDERICK CHANCE, have hereunto set our hands.

ALEXANDER MACOMB CHANCE.
JAMES FREDERICK CHANCE.

Witnesses:
J. R. HOLLIDAY,
W. H. HARRIS.